United States Patent [19]

Gargione

[11] Patent Number: 5,226,572
[45] Date of Patent: Jul. 13, 1993

[54] BULB ACTUATOR FOR DROPPER CLOSURE

[75] Inventor: Frank V. Gargione, Egg Harbor, N.J.

[73] Assignee: Comar, Inc., Buena, N.J.

[21] Appl. No.: 897,077

[22] Filed: Jun. 11, 1992

[51] Int. Cl.⁵ .............................................. B65D 47/00
[52] U.S. Cl. .................................. 222/214; 222/420; 141/24; 73/864.11; 604/214
[58] Field of Search .............. 222/206, 214, 215, 420, 222/421, 422; 604/214; 141/23, 24, 25; 215/231, 3; 73/864.11, 864.03

[56] References Cited

U.S. PATENT DOCUMENTS

| | | | |
|---|---|---|---|
| 2,966,284 | 12/1960 | Lewis | 222/214 X |
| 3,020,938 | 2/1962 | Ballin | 141/24 |
| 3,820,576 | 6/1974 | Torrent | 141/24 |
| 4,296,071 | 10/1981 | Weiss et al. | 73/864.11 |
| 5,154,702 | 10/1992 | Foyil | 222/214 X |

Primary Examiner—Andres Kashnikow
Assistant Examiner—A. Pomrening
Attorney, Agent, or Firm—Brady, O'Boyle & Gates

[57] ABSTRACT

A bulb actuator for a dropper closure wherein an overcap is mounted on the dropper closure. A bulb squeeze member is slidably mounted in the overcap and has a pair of fingers engaging and straddling the bulb. The fingers are cammed inwardly to squeeze the bulb when the bulb squeeze member is pressed inwardly of the overcap.

7 Claims, 1 Drawing Sheet

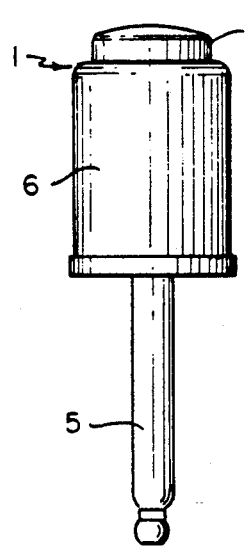
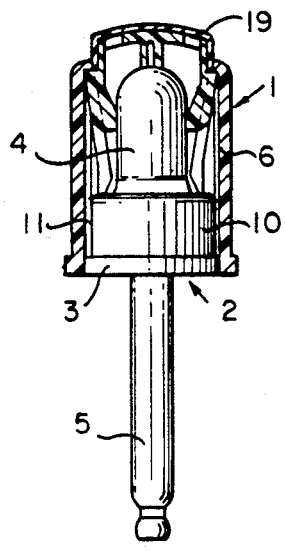
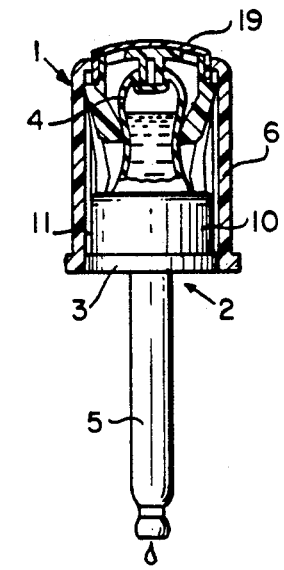
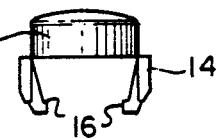
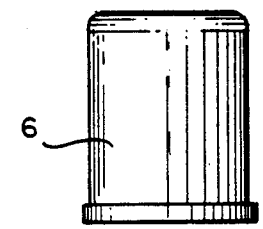
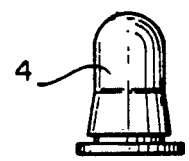
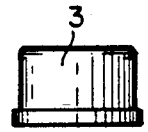
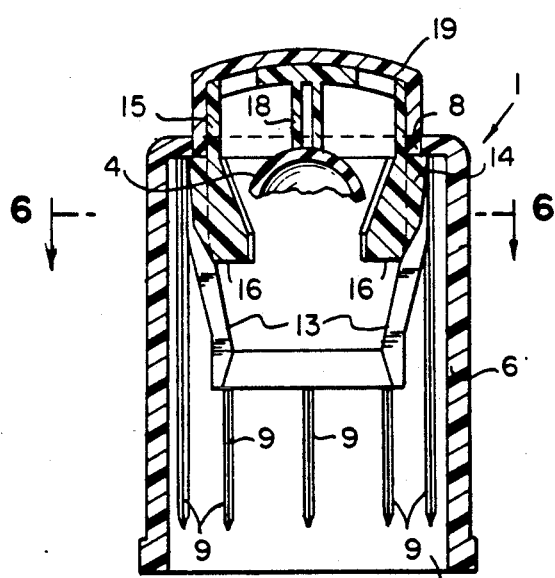
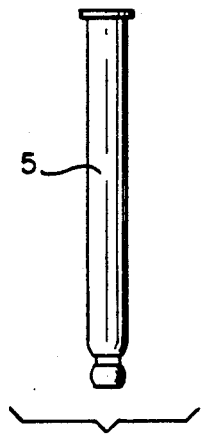
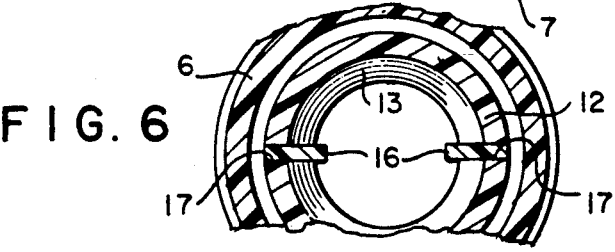

BULB ACTUATOR FOR DROPPER CLOSURE

BACKGROUND OF THE INVENTION

The pharmaceutical industry widely uses the conventional dropper closure assembly wherein a squeezable bulb communicating with an attached pipette is connected to a closure for a container holding a medication, whereby measured amounts of the medicament can be removed from the container by squeezing and releasing the bulb to draw the medicament through the pipette into the bulb, removing the closure and associated pipette and bulb from the container, and then, once again, squeezing the bulb to expel the medicament therefrom.

Various actuators have been proposed to facilitate the drawing of a fluid into a compressible chamber and expelling of it therefrom, as shown in U.S. Pat. Nos. 3,020,938, dated Feb 13, 1962: 3,820,576, dated Jun. 28, 1974; and 4,296,071, dated Oct. 20, 1981.

In order to more closely simulate the manual squeezing of a closure dropper bulb wherein the bulb is positioned between the thumb and index finger of the user, the bulb actuator of the present invention has been devised.

SUMMARY OF THE INVENTION

The bulb actuator of the present invention comprises, essentially, an overcap open at each end thereof. One end of the overcap is adapted to frictionally fit over a conventional closure having an associated bulb and pipette. The overcap has an internal inwardly extending conical surface, and a bulb squeezer member is slidably mounted in the overcap and having a portion extending outwardly from the other open end of the overcap. The bulb squeezer member is provided with a pair of spaced, downwardly depending, resilient fingers which straddle the dropper bulb and engage the inwardly extending conical surface of the overcap, whereby when the bulb squeezer member is manually pushed downwardly, the depending fingers ride on the conical surface and are cammed radially inwardly to pinch the bulb. To facilitate the return movement of the squeezer member, a depending post is integral with the squeezer member and engages the upper end portion of the bulb.

BRIEF DESCRIPTION OF THE DRAWINGS

FIG. 1 is a side elevational view of the bulb actuator of the present invention mounted on a conventional dropper closure assembly;

FIG. 2 is a sectional side elevational view of the bulb actuator shown in FIG. 1;

FIG. 3 is a sectional side elevational view of the bulb actuator shown in FIG. 2, showing the bulb squeezer member pushed downwardly to dispense the fluid from the bulb and associated pipette;

FIG. 4 is an exploded view illustrating the various components of the actuator and dropper closure assembly;

FIG. 5 is an enlarged, fragmentary, sectional side elevational view illustrating the bulb actuator of the present invention; and FIG. 6 is a view taken along line 6—6 of FIG. 5.

BRIEF DESCRIPTION OF THE PREFERRED EMBODIMENT

Referring to the drawings and more particularly to FIGS. 1 and 2, the actuator 1 of the present invention is adapted for connection to a conventional closure dropper assembly 2 having a closure 3, adapted to be threadably mounted on a container (not shown), a squeezable bulb 4 secured to the closure 3 and a pipette 5 secured to and communicating with the bulb 4.

The details of the construction of the actuator 1 are illustrated in FIGS. 2, 3, 5 and 6, wherein it will be seen that the actuator 1 comprises a cylindrical overcap 6 having an open lower end 7 and an open upper end 8. The internal wall surface of the overcap 6 is formed with a plurality of longitudinally extending, circumferentially spaced ribs 9 engageable with a grooved surface 10 formed on the outer wall surface of the closure 3, to thereby provide a spline connection 11 between the overcap 6 and the closure 3. The upper open end of the overcap 6 is provided with a depending annular wall 12 spaced inwardly from the inner wall surface of the overcap 6 and terminating above the lower open end 7 thereof. The annular wall 12 is provided with an inwardly extending conical surface 13.

A bulb squeezer member 14 is slidably mounted in the overcap 6 and has a portion 15 extending outwardly from the overcap 6 through the upper open end 8, and a pair of spaced, downwardly depending resilient fingers 16 having inner surfaces straddling and engaging the bulb 4 and outer surfaces slidably mounted in oppositely facing slots 17 cut in the side of the annular wall 12, whereby the sliding movement of the squeeze member 14 within the overcap 6 is guided. By this construction and arrangement, when the bulb squeeze member 14 is manually pushed downwardly, the depending fingers 16 slide on the conical surface 13 and are thereby cammed radially inwardly to pinch the bulb 4.

To facilitate the return movement of the squeeze member 14 to the extended position, the portion 15 of the squeeze member 14 is provided with a depending post 18 having its free end engaging the top of the bulb 4, whereby the resiliency of the bulb 4 will bias the squeeze member 14 upwardly to the extended position.

To complete the structure of the actuator, a top cap 19 is placed over the extended portion 15 of the squeeze member 14.

From the above description, it will be appreciated by those skilled in the art that the actuator of the present invention is readily attachable to conventional dropper closure assemblies, and by the construction and arrangement of the overcap 6 and squeeze member 14, the squeezing of the bulb more closely approximates the manually squeezing of the bulb, wherein the bulb is grasped between the thumb and index finger, than has been done heretofore with other types of bulb actuators.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A bulb actuator for a dropper closure of the type having a container closure, a squeezable bulb secured to the closure and a pipette secured to and communicating with said bulb, said actuator comprising an overcap, said overcap being open at each end thereof, one end of said overcap being slip-fit over said closure, a bulb squeeze member slidably mounted in said overcap, said squeeze member having a portion extending above the bulb and outwardly from the other end of said overcap, said squeeze member having a pair of spaced, depending resilient fingers straddling and engaging said bulb, and means operatively connected between said overcap and said squeeze member for camming the fingers inwardly, whereby when the squeeze member is pushed into the overcap, the resilient fingers are cammed radially inwardly to squeeze the bulb.

2. A bulb actuator according to claim 1, wherein the means for camming the fingers inwardly comprises an inwardly extending conical surface provided on an inner wall of said overcap, said fingers having outer surfaces engaging the conical surface, and inner surfaces engaging the bulb.

3. A bulb actuator according to claim 2, wherein oppositely facing slots are provided in the conical surface, the outer surfaces of the fingers being positioned in said slots, whereby the movement of the squeeze member within the overcap is guided.

4. A bulb actuator according to claim 1, wherein biasing means are operatively connected between the squeeze member and the bulb for biasing the squeeze member to an extended position.

5. A bulb actuator according to claim 4, wherein the biasing means comprises, a post integral with the extended portion of the squeeze member and depending therefrom, the free end of said post engaging the upper end portion of the bulb, whereby the resiliency of the bulb biases the post and thus the squeeze member to the extended position.

6. A bulb actuator according to claim 1, wherein a spline connection is provided between the closure and said one end of said overcap.

7. A bulb actuator according to claim 1, wherein a cap is mounted on the extended portion of said squeeze member.

* * * * *